(12) United States Patent
Stavely et al.

(10) Patent No.: US 8,289,399 B2
(45) Date of Patent: Oct. 16, 2012

(54) SYSTEM AND METHOD FOR IMAGE CAPTURE DEVICE

(75) Inventors: Donald J. Stavely, Windsor, CO (US); Mark E. Wanger, Fort Collins, CO (US); James Anderson, Fort Collins, CO (US); Casey Miller, Fort Collins, CO (US); David Kay Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1810 days.

(21) Appl. No.: 10/914,540

(22) Filed: Aug. 9, 2004

(65) Prior Publication Data
US 2006/0029377 A1 Feb. 9, 2006

(51) Int. Cl.
*H04N 5/228* (2006.01)
*G03B 17/00* (2006.01)

(52) U.S. Cl. ........................................ 348/208.1; 396/56

(58) Field of Classification Search ............. 348/208.12, 348/352, 208.1, 216.1, 208.99, 208.2, 208.5, 348/208.3, 208.4, 208, 208.6, 208.13, 345, 348/362; 396/55, 52, 56
See application file for complete search history.

(56) References Cited

U.S. PATENT DOCUMENTS

| 4,709,138 A | * | 11/1987 | Suda et al. ................. 250/201.8 |
| 5,107,103 A | | 4/1992 | Gruss et al. |
| 5,142,357 A | * | 8/1992 | Lipton et al. ..................... 348/48 |
| 5,204,741 A | * | 4/1993 | Sakaguchi ................. 348/208.6 |
| 5,305,294 A | * | 4/1994 | Kime et al. ................. 369/13.17 |
| 5,990,943 A | * | 11/1999 | Yamazaki ................. 348/208.8 |
| 6,407,771 B1 | * | 6/2002 | Kanbara et al. .......... 348/207.99 |
| 6,631,042 B2 | * | 10/2003 | Noguchi ....................... 359/823 |
| 7,339,612 B1 | * | 3/2008 | Yajima ....................... 348/208.7 |
| 7,583,293 B2 | * | 9/2009 | Norskog ..................... 348/218.1 |
| 2002/0030749 A1 | * | 3/2002 | Nakamura et al. ............ 348/220 |
| 2004/0212699 A1 | * | 10/2004 | Molgaard ................ 348/231.99 |

FOREIGN PATENT DOCUMENTS

| JP | 3134605 A | 6/1991 |
| WO | WO 2004001667 A2 * | 12/2003 |
| WO | WO 2004001667 A3 * | 4/2004 |

* cited by examiner

*Primary Examiner* — Chieh M Fan
*Assistant Examiner* — Ahmed A Berhan

(57) ABSTRACT

A system and method for stabilization of an image capture device are disclosed. Also disclosed are a system and method for autofocus of an image capture device.

28 Claims, 10 Drawing Sheets

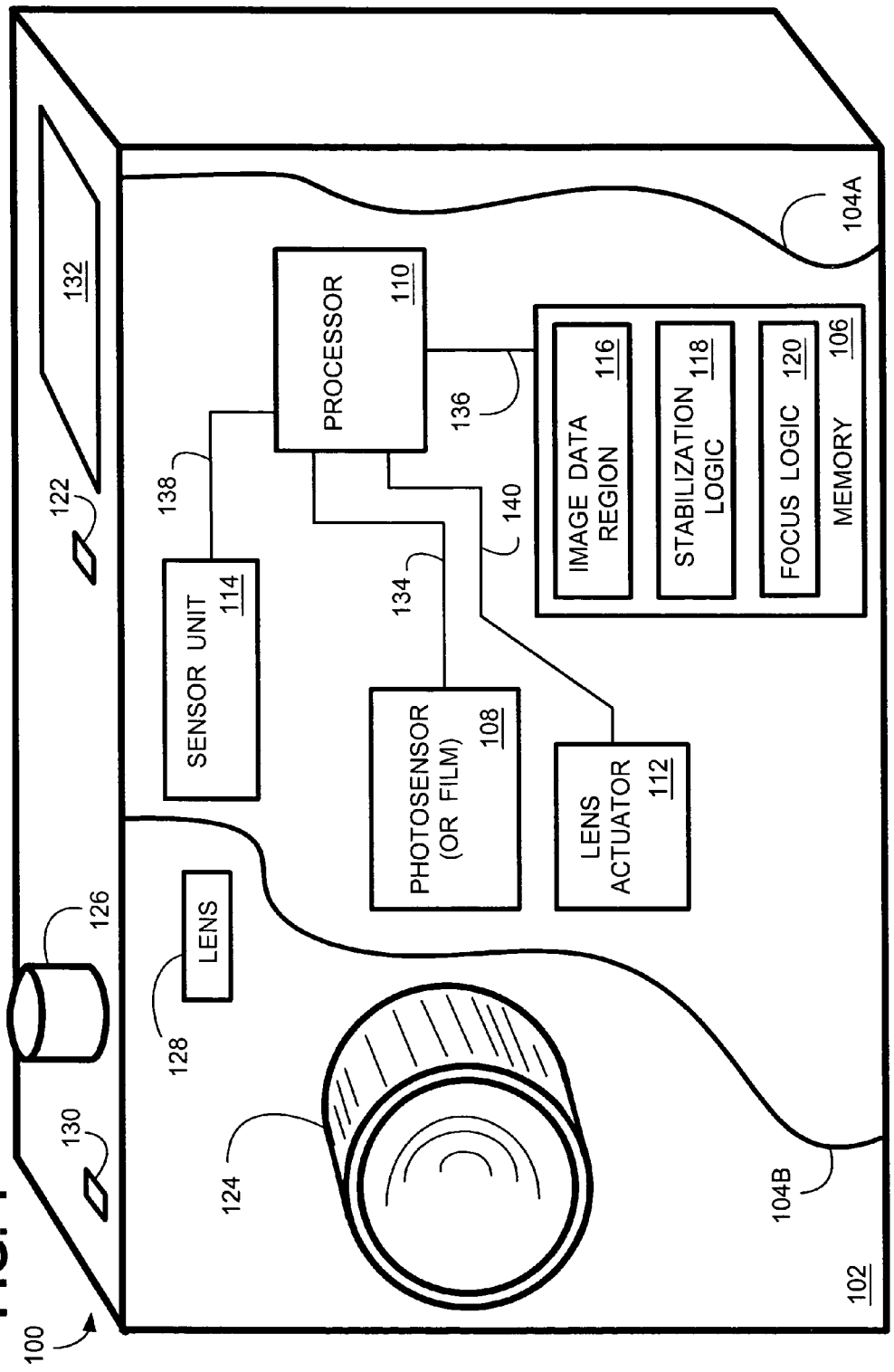

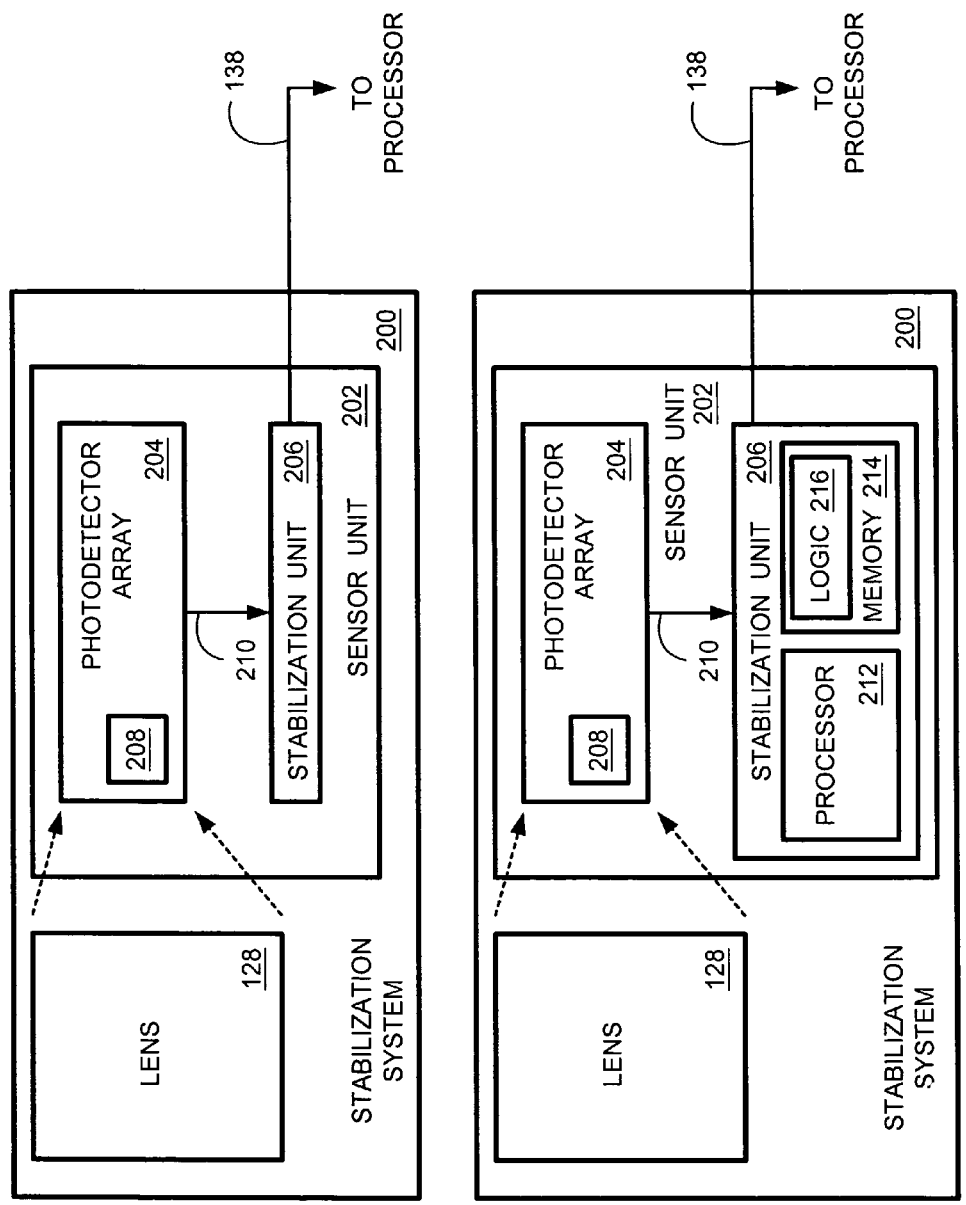

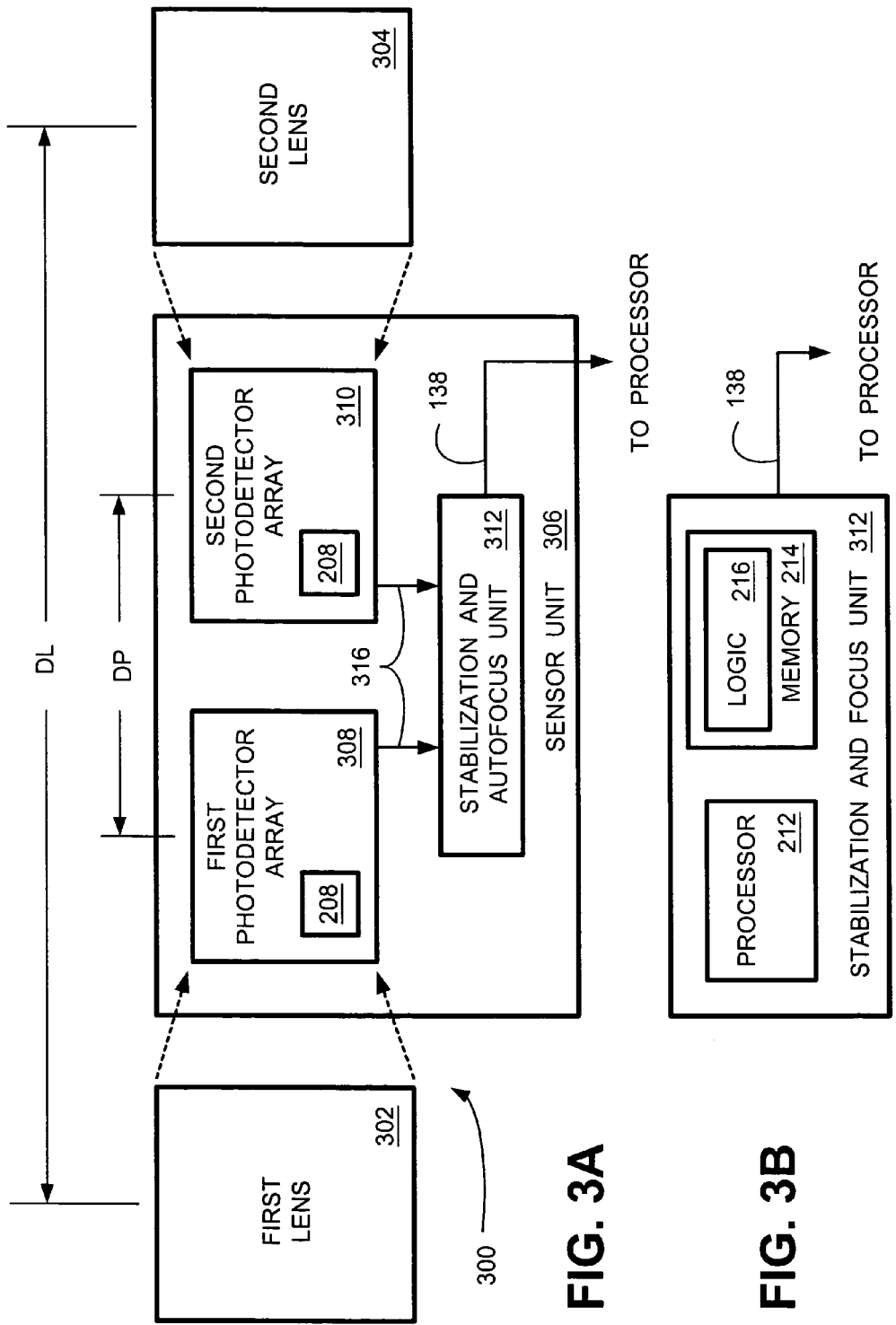

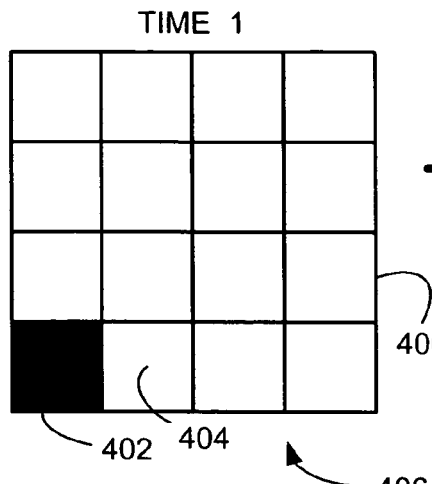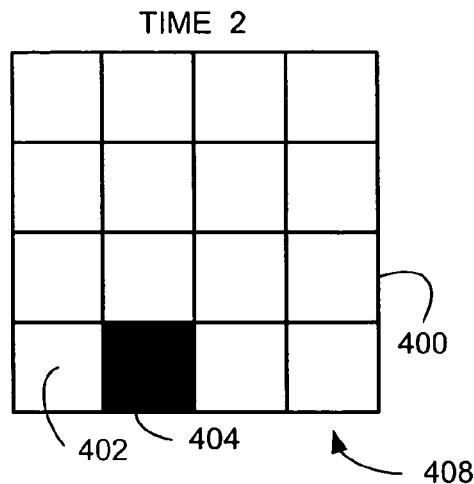
FIG. 4A  FIG. 4B
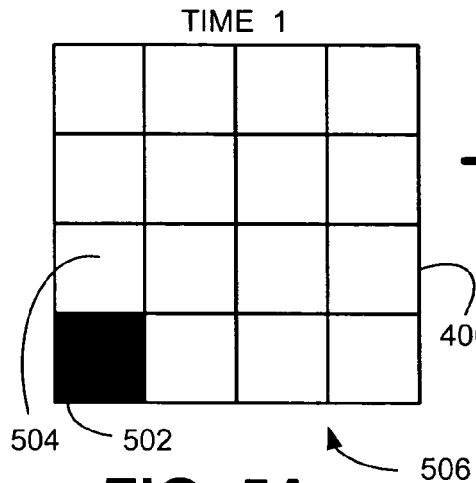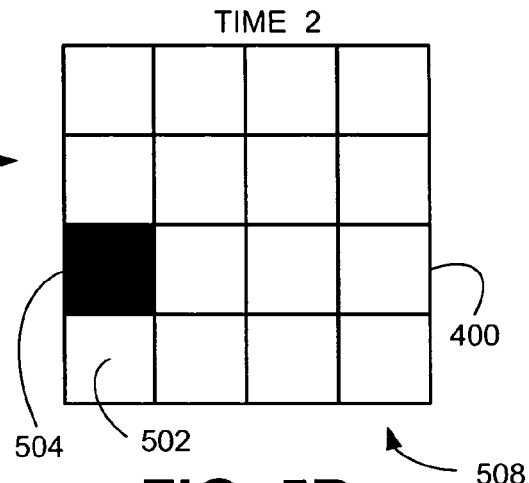
FIG. 5A  FIG. 5B
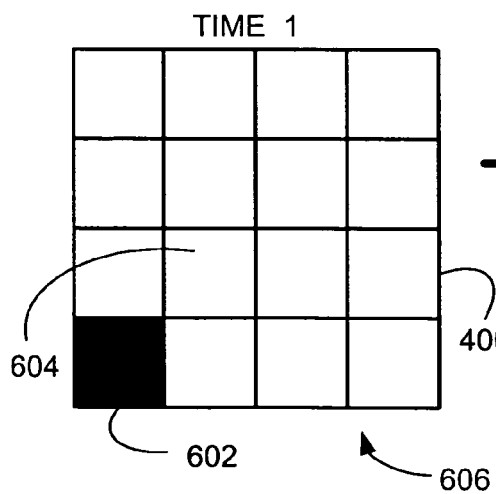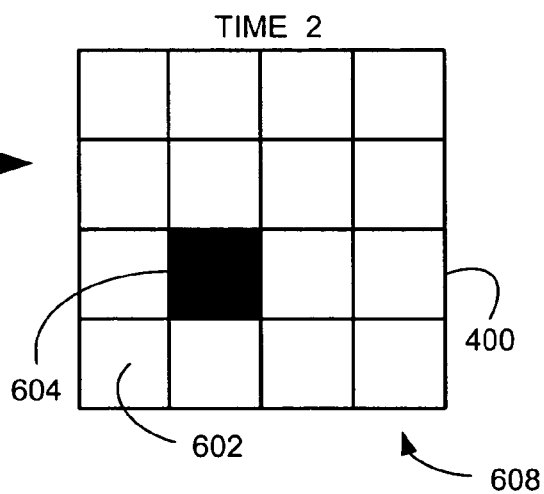
FIG. 6A  FIG. 6B

SYSTEM AND METHOD FOR IMAGE CAPTURE DEVICE

TECHNICAL FIELD

The present invention is generally related to image capture devices and, more particularly, one embodiment is related to a system and method for stabilization of an image capture device. Another embodiment is related to a system and method for autofocus of an image capture device.

BACKGROUND

Stabilization of an image capture device is desirable when the user is not able to hold the image capture device in a stable position during image capture. If the image capture device is not stable, the captured image may be blurred or otherwise distorted. Such movement is often referred to as "jitter" in the art. Jitter may arise from external sources, such as wind or vibrations from a moving vehicle or the like, or may arise from motion of the user of the image capture device. Such user motion may occur when the user is in a moving vehicle, and/or if the user is physically impaired in a manner that prevents the user from holding the image capture device in a steady position.

Some image capture devices employ stabilization systems to counter the effect of jitter. In some image capture devices, gyroscopes or other physical sensors are employed to detect jitter. One type of image capture device compensates by physically moving one or more components of the image capture device lens system and/or the image capture medium (such as the film or the digital image sensor array). Another type of image capture device compensates for jitter by compensating the digital data corresponding to the capture image.

Some types of image capture devices provide an autofocus system that automatically focuses the image capture device before image capture. Thus, the user of the image capture device does not have to manually focus the image capture device. One type of digital autofocus system evaluates all or part of a series of digitally captured images taken while the lens is moved through some or all of its focus range, and then selects the best "focus" based upon an autofocus correlation algorithm that identifies one or more images that are likely to be focused. That is, the autofocus correlation algorithm determines a desirable "focus value" based upon analysis of image data received from the image capture device photosensor. Then, the image capture device lens unit is adjusted to a focus setting corresponding to the determined focus value. However, capture of a plurality of images and the associated execution of the autofocus correlation algorithm using the image capture device photosensor requires a discernable period of time before image capture occurs.

Another type of autofocus system employs two lens and two corresponding detectors, separated by a distance such that a stereoscopic effect is determinable by the two detectors. The two detectors provide image information that is spatially correlated such that a subject distance is determined. Then, the image capture device lens unit is adjusted to a coarse focus setting corresponding to the determined distance.

Other image capture devices employ both a stereoscopic autofocus system and a digital autofocus system. The stereoscopic autofocus system can provide a relatively quick coarse autofocus adjustment. Then, the digital autofocus system provides a finer focus adjustment. Such hybrid autofocus systems are relatively quicker and more reliable than either the stereoscopic autofocus system and the digital autofocus system alone. However, operation of a hybrid autofocus system still requires a discernable period of time before image capture occurs.

SUMMARY

One embodiment may comprise a first lens configured to focus an image of an object onto an image capture medium, a photodetector array configured to successively capture a portion of the object, a second lens configured to focus the portion of the object onto the photodetector array, and a processor configured to receive data corresponding to the captured portion or the object, determine a change in position of the portion of the object, and determine image stabilization information that corresponds to the determined change in position.

Another embodiment may comprise a photodetector array configured to capture a portion of an object that is to be captured by an image capture device through an image capture device lens, and a lens configured to focus the portion of the object onto the photodetector array such that a processor receiving successively captured image data from the photodetector array determines a change in position between the successively captured object portions, and such that the processor determines image stabilization information corresponding to the determined change in position.

Another embodiment may comprise a first photodetector array configured to capture a first image of a portion of an object that is to be captured through the image capture device lens when the image is focused onto an image capture medium by the image capture device lens; a first lens configured to focus the object portion onto the first photodetector array; a second photodetector array configured to capture a second image of the object portion; and a second lens configured to focus the object portion onto the second photodetector array, such that a processor receives data corresponding to the concurrently captured first image and second image, and determines image focus information corresponding to the determined difference in position of the object portion between the concurrently captured first image and second image such that the image is focused on the image capture medium by the image capture device lens.

Another embodiment may comprise capturing a first image of a portion of an object at a first time, wherein the object portion corresponds to an object of interest that is to be captured by an image capture device through an image capture device lens, capturing a second image of the object portion at a later time, determining a distance corresponding to movement between the first image and the second image, and determining stabilization compensation corresponding to the determined distance of movement.

Another embodiment may comprise capturing a first image of a portion of an object at a first time, wherein the object portion corresponds to an object of interest that is to be captured by an image capture device through an image capture device lens, capturing a second image of the object portion at the same time, determining a distance corresponding to a difference in position of the object portion, and determining an amount of focus compensation corresponding to the determined distance in position.

Another embodiment may comprise capturing a first image of a portion of an object at a first time, wherein the object portion corresponds to an object captured by an image capture device through an image capture device lens; capturing a second image of the object portion at a later time; capturing a third image of the object portion concurrently with the first image; determining a distance corresponding to movement of the object portion between the first image and the second image; determining stabilization compensation corresponding to the determined distance of movement; determining another distance corresponding to a difference in position of the object portion between the first image and the third image; and determining an amount of focus compensation corresponding to the determined distance in position.

Another embodiment may comprise a first means for capturing a first image of a portion of an object at a first time, and for capturing a second image of the object portion at a later time, wherein the object portion corresponds to an object of interest that is to be captured by an image capture device through an image capture device lens; a second means for capturing a third image of the object portion concurrently with capture of the first image; a means for determining stabilization compensation based upon a determined distance corresponding to movement between the first image and the second image; and a means for determining an amount of focus compensation based upon a determined difference corresponding to a difference in position between the first image and the third image.

Another embodiment may comprise capturing a first image of a portion of an object at a first time, wherein the object portion corresponds to an object of interest that is to be captured by an image capture device through an image capture device lens; capturing a second image of the object portion at a later time; capturing a third image of the object portion concurrently with capture of the first image; determining stabilization compensation based upon a determined distance corresponding to movement between the first image and the second image; and determining an amount of focus compensation based upon a determined difference corresponding to a difference in position between the first image and the third image.

BRIEF DESCRIPTION OF THE DRAWINGS

The components in the drawings are not necessarily to scale relative to each other. Like reference numerals designate corresponding parts throughout the several views.

FIG. 1 is a block diagram illustrating an embodiment of the image capture system implemented in an image capture device.

FIGS. 2A-B are block diagrams of an embodiment of the stabilization unit.

FIGS. 3A-B are block diagrams of an embodiment of the stabilization and autofocus unit.

FIGS. 4A-B are diagrams illustrating detection of image capture device movement (jitter), and/or movement of the object of interest, in a horizontal direction by an embodiment of the stabilization unit (FIG. 2) and/or the stabilization and autofocus unit (FIG. 3).

FIGS. 5A-B are diagrams illustrating detection of image capture device movement (jitter), and/or movement of the object of interest, in a vertical direction by an embodiment of the stabilization unit (FIG. 2) and/or the stabilization and autofocus unit (FIG. 3).

FIGS. 6A-B are diagrams illustrating detection of image capture device movement (jitter), and/or movement of the object of interest, in a horizontal and a vertical direction by an embodiment of the stabilization unit (FIG. 2) and/or the stabilization and autofocus unit (FIG. 3).

DETAILED DESCRIPTION

Figure 7:
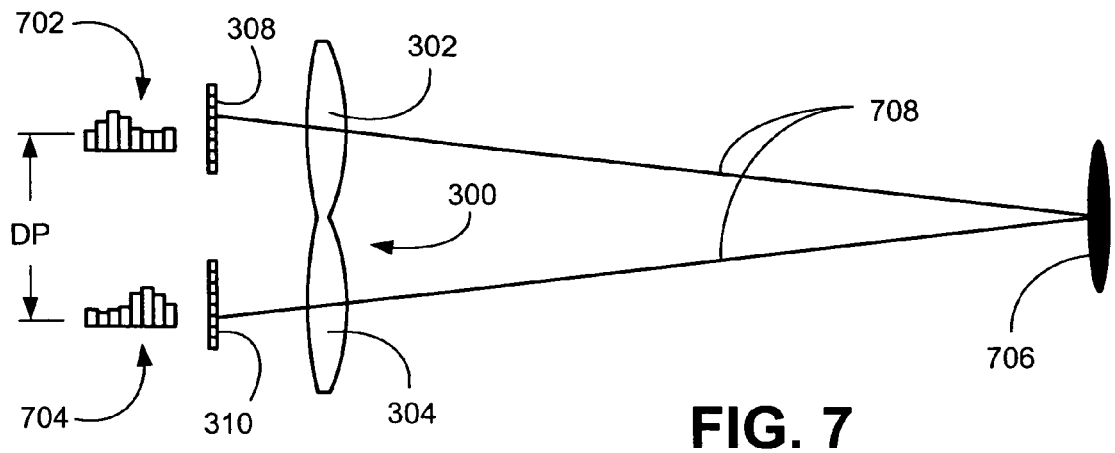
FIG. 7 is a block diagram illustrating the autofocus portion of an embodiment of an autofocus and stabilization system.

One embodiment of an image capture system 100 provides a system and method for stabilizing an image. Another embodiment provides an autofocus feature. FIG. 1 is a block diagram illustrating an embodiment of the image capture system 100 implemented in an image capture device 102.

Selected external and internal components of image capture device 102 are demarked by cut-away lines 104a and 104b. Internal components, illustrated between cut-away lines 104a and 104b, include at least memory 106, photosensor 108, processor 110, lens actuator 112 and sensor unit 114. In one embodiment, memory 106 further includes an image data region 116 configured to store captured images and stabilization logic 118. Another embodiment further includes focus logic 120 in memory 106. External components of image capture device 102 includes at least control button 122, image capture device lens (assembly) 124, image capture actuation button 126, lens (assembly) 128, power switch 130 and display 132. Lens 124 may be referred to as the "camera lens." It is used to focus an image of an object of interest onto an image capture medium. Thus, lens 124 is a unit having components used for focusing the image onto the image capture medium.

Operation of the image capture device 102 is initiated by actuation of the power switch 130 or an equivalent device having the same functionality. Display 132 may display a view of an image currently imaged by the lens 124 and detected by photosensor 108, referred to herein as a preview image. When image capture device 102 is displaying a preview image, image capture device 102 is referred to herein as operating in a preview mode.

Alternatively, an image of a previously captured image may be viewed on display 132. When image capture device 102 is displaying a previously captured image, image capture device 102 is referred to herein as operating in a review mode. Furthermore, a menu screen may be displayed on display 132 to control features of the various embodiments described herein.

Prior to capturing an image, the user of the image capture device 102 may visually preview the image on display 132. Or, the image may be viewed directly through an optional viewing lens (not shown). Photosensor 108 is disposed in a suitable location behind lens 124 such that an image to be captured may be focused onto photosensor 108 for capturing. When the user has focused the image and is satisfied with the focused image, the user actuates the image capture actuation button 126 (also referred to as a shutter button or a shutter release button) to cause image capture device 102 to capture the image. In embodiments employing the autofocus feature, described hereinbelow, the image is automatically focused by the image capture system 100 before image capture.

Photosensor 108 generates digital image data corresponding to the object which is imaged thereon by image capture device lens 124. After focusing, the image is "captured" when photosensor 108 communicates the digital image data corresponding to the image to the processor 110, via connection 134. In this exemplary embodiment, data corresponding to the captured image is communicated to memory 106, via connection 136, and stored in the image data region 116. In another embodiment, data corresponding to the captured image is communicated to another suitable memory device (not shown).

Some embodiments of the image capture system 100 automatically analyze movement (image jitter) based upon stabilization information from the sensor unit 114, communicated to processor 110 via connection 138. Processor 110 executes the stabilization logic 118 to determine image stabilization, and then communicates an image stabilization control signal to the lens actuator 112, via connection 140 in one embodiment, or to other components that provide physical stabilization of the captured image in other embodiments. Accordingly, such embodiments may be implemented in digital image captured devices or film-based image capture devices.

In another embodiment, the stabilization information is processed to determine image stabilization compensation. During the processing of the image data, the image stabilization compensation is used to computationally compensate the digital image data received from photosensor 108, thereby compensating for movement (jitter).

In an embodiment employing an autofocus feature, focus of the image is determined automatically based upon focus information from the sensor unit 114, communicated to processor 110 via connection 138. Processor 110 executes the focus logic 120 to determine the focus information, and then communicates a corresponding autofocus control signal to the lens actuator 112, via connection 140. Lens actuator 112 adjusts the focus of image capture device lens 124, thereby focusing the image onto an image capture medium, such as the illustrated photosensor 108. In an alternative embodiment, the image is focused on the film of a film-based image capture device, wherein the film is the image capture medium.

FIG. 2A is a block diagram of an embodiment of a stabilization system 200. Stabilization system 200 includes lens 128 (see also FIG. 1) and sensor unit 202 (corresponding to sensor unit 114 of FIG. 1). Sensor unit 202 includes photodetector array 204 and stabilization unit 206. Sensor unit 202, in one embodiment, is a single silicon chip with the photodetector array 204 and the stabilization unit 206 fabricated thereon. Other embodiments may be fabricated as multiple components.

Photodetector array 204 is oriented behind lens 128 such that light passing through lens 128 is imaged on photodetector array 204. Also lens 128 is arranged relative camera lens 124 such that it images the same object, or at least a portion of the same object onto photodetector array 204 that is currently being imaged by camera lens 124 onto camera photosensor 108. In one embodiment, photodetector array 204 is a relatively small sensor array (compared to the photosensor 108 of FIG. 1) with relatively few photodetectors 208. Photodetectors 208 are also referred to herein as pixels for convenience. The photodetectors 208 may be relatively large sensors (compared to photodetectors residing on the photosensor 108) in alternative embodiments. Accordingly, since there are relatively few photodetectors 208 on photodetector array 204, image data from the photodetectors 208 is quickly read from the photodetector array 204 (relative to the time required to read image data from the camera photosensor 108). The image data is communicated to the stabilization unit 206, via connection 210. The received image data is quickly processed by the stabilization unit 206 (relative to processing of image data received from the photosensor 108) and the image stabilization information is communicated to processor 110 (FIG. 1), via connection 138.

In one embodiment, photodetector array 204 is a 16-by-16 pixel sensor that is capable of reading 30 images per second or more, depending on exposure time whereas the photosensor 108 may be a photodetector array that reads images at a relatively slower rate, e.g. five to ten images per second. In most embodiments, the number of photodetectors 208 in array 204 is a small percentage of the number of photodetectors on photosensor 108. Embodiments of photodetector array 204 may comprise any suitable number and/or size of photodetectors 208 such that the image stabilization information can be determined very quickly (relative to the image capture process).

As described in greater detail herein, in one embodiment, at least one point of contrast from successively captured portions of the image data are compared to determine movement (changes of position of the points of contrast) of the image portion. A point of contrast, as used herein, is a small region of an image that indicates a sufficient change in contrast over the small region wherein the change of contrast for the region is computationally identifiable and greater than a predefined threshold. Thus, a point of contrast need not be a whole photosensor 208 (FIGS. 2A, 2B, 3A and 3B). One non-limiting example is a detected edge in an image. A portion of a detected edge is identified, in one embodiment, as a point of contrast. In another embodiment, an identifiable edge may be used as a point of contrast. Or, an edge may be used to define a plurality of points of contrast.

In another embodiment, the difference in position of successively captured images can be determined using a correlation function. The image data from a first image is correlated in X and Y dimensions against the image data of a successive image. The peak of the correlation function corresponds to the best estimate of image movement between the two images. Accordingly, the motion information needed for image stabilization can be quickly calculated.

Use of a two-dimensional correlation function for determining the relative motion of image data between two images is known and is not described in detail herein for brevity. For example, the MPEG video compression standard generates "motion vectors" between successive images to estimate motion to improve compression rates.

Note that due to the small number of pixels in the photodetector arrays 902 and 904, the motion of the image data due to camera motion (jitter) may be small compared to the pixel spacing. In one embodiment, fractional pixel resolution is needed for the image stabilization information. Interpolation techniques may be used to calculate motion to much finer resolution than the detector array resolution. Such interpolation techniques are known and are not described in detail herein for brevity.

Differences in the successively captured image data corresponds to image movement (jitter). Accordingly, the differences between the successively captured image data are identified and the image stabilization information can be determined very quickly. The processor can then compensate image data received from the photosensor 108, based upon the image stabilization control signal, such that an image with reduced distortion (less jitter) is captured. In another embodiment, an image stabilization control signal can be generated by processor 110 and communicated to the lens actuator 112 (FIG. 1) or another component that provides physical stabilization of the image. The image stabilization control signal is quickly generated (relative to the processing time associated with processing a captured image from the photosensor 108 of FIG. 1) because the few number of photosensors on the photodetector array is very small relative to the number of photodetectors on the photosensor 108.

In the embodiment illustrated in FIG. 2A, stabilization unit 206 is implemented as firmware fabricated onto the sensor unit 202 when the silicon chip is fabricated. In another embodiment, shown in FIG. 2B, a processor 212 and memory 214 are included as part of the stabilization unit 206. Processor 212 executes the logic 216 to determine the stabilization information. Processor 212 and memory 214 are fabricated onto the sensor unit 202 when the silicon chip is fabricated. Logic 216 is then loaded into the memory 214. Thus, software may be used to process the image data received from photodetector array 204. Other embodiments of the stabilization unit 206 may employ a combination of firmware and software. Also, other embodiments may have processor 212, memory 214 and/or logic 216 as separate components.

FIG. 3A is a block diagram of an embodiment of a stabilization and autofocus system 300. Stabilization and autofocus system 300 includes a first lens 302 and a second lens 304, physically separated by some distance (distance between lens, DL) to provide a stereoscopic effect. The first lens 302 and second lens 304 may be implemented as a single physical unit, and therefore correspond to lens 128 illustrated in FIG. 1, or may be implemented as two separate lenses. Stabilization and autofocus system 300 further includes sensor unit 306 (corresponding to sensor unit 114 of FIG. 1). Sensor unit 306 includes a first photodetector array 308, a second photodetector array 310 and a stabilization and autofocus unit 312. The first photodetector array 308 and the second photodetector array 310 are physically separated by some distance (distance between photosensors, DP), to provide the stereoscopic effect. In one embodiment, sensor unit 306 is a single silicon chip with the first photodetector array 308, the second photodetector array 310 and the stabilization and autofocus unit 312 fabricated thereon. In this embodiment, DP may be significantly smaller than DL, as described later. Other embodiments may be fabricated as separate components.

The first photodetector array 308 is oriented behind the first lens 302 such that a small portion of the image to be captured is also projected onto the first photodetector array 308. Similarly, the second photodetector array 310 is oriented behind the second lens 304 such that approximately the same small portion of the image to be captured is projected onto the second photodetector array 310. As described in greater detail hereinbelow, differences in at least one point of contrast between images captured by the photodetector arrays 308 and 310 are used to determine image focusing.

In one embodiment, photodetector arrays 308 and 310 are relatively small sensor arrays (compared to the photosensor 108 of FIG. 1) with relatively few photodetectors 208. The photodetectors 208 may be relatively large sensors (compared to photodetectors residing on the photosensor 108) in alternative embodiments. Embodiments of photodetector arrays 308 and 310 may comprise any suitable number and/or size of photodetectors 208.

Since there are relatively few photodetectors 208, image data from the photodetectors 208 is quickly read from the photodetector arrays 308 and 310 (relative to the time required to read image data from the photosensor 108) and communicated to the stabilization and autofocus unit 312, via connections 316. The received image data is quickly processed by the stabilization and autofocus unit 312 (relative to processing of image data received from the photosensor 108) into image stabilization and autofocus information. This information is communicated to processor 110 (FIG. 1), via connection 138. The stabilization and autofocus unit 312, and/or the photodetector arrays 308 and 310, may be similar to the above-described stabilization unit 206 and/or the above-described photodetector array 204, respectively.

In one embodiment, the stabilization portion of the image stabilization and autofocus information is determined from image data provided by a selected one of the photodetector arrays 308 and 310. In another embodiment, the stabilization portion of the image stabilization and autofocus information is determined from image data provided by both of the photodetector arrays 308 and 310.

Image data from the photodetector arrays 308 and 310 are used to determine the autofocus portion of the image stabilization and autofocus information. The autofocus information is based upon a stereoscopic effect caused by the known physical separation DL.

In the embodiment illustrated in FIG. 3A, stabilization and autofocus unit 312 is implemented as firmware fabricated onto the sensor unit 306 when the silicon chip is fabricated. In another embodiment, shown in FIG. 3B, the above-described processor 212 and memory 214 are included as part of, or separately from, the stabilization and autofocus unit 312. Processor 212 executes the logic 216 to determine the stabilization and focus information. Processor 212 and memory 214 are fabricated onto the sensor unit 306 when the silicon chip is fabricated. Logic 216 is then loaded into the memory 214. Thus, software may be used to process the image data received from photodetector arrays 308 and 310. Other embodiments of the stabilization and autofocus unit 312 may employ a combination of firmware and software.

The above-described embodiment of the stabilization system 200 (FIG. 2) comprises lens 128, and the stabilization and autofocus system 300 (FIG. 3) comprises lens 302 and 304. In alternative embodiments, lens 128, 302 and/or 304 are omitted.

Light that is detected by the photodetectors 208 is provided from lens 124 (FIG. 1) by a suitable beam-splitting lens system or the like.

In other embodiments, image data detected by photodetector array 204 (FIG. 2) or photodetector arrays 308 and 310 (FIG. 3) are communicated (as stabilization information and/or as autofocus information) to processor 110. Accordingly, the stabilization unit 206 (FIG. 2) and the stabilization and autofocus unit 312 (FIG. 3) are omitted.

FIGS. 4A-B are diagrams illustrating detection of image capture device movement (jitter) or image movement in a horizontal direction by an embodiment of the stabilization system 200 (FIG. 2) and/or the stabilization and autofocus system 300 (FIG. 3). FIGS. 5A-B are diagrams illustrating detection of image capture device movement (jitter) and/or image movement in a vertical direction. FIGS. 6A-B are diagrams illustrating detection of image capture device movement (jitter) and/or image movement in a horizontal and a vertical direction. For convenience, the photodetector arrays 400 are illustrated as a 4-by-4 pixel array. Any suitable number of pixels may be employed by various embodiments in the photodetector array 400. Photodetector array 400 corresponds to one of the above-described photodetector arrays 204, 308 and/or 310 (FIGS. 2 and 3).

In FIGS. 4A-B, 5A-B and 6A-B, the photodetectors of the 4-by-4 pixel array are illustrated for convenience as detecting a portion of an object that is either white or black. Thus, contrast (white vs. black) is maximized in the simplified illustrations of FIGS. 4A-B, 5A-B and 6A-B. It is understood that any suitable degree of contrast detected by the photodetectors allows detection of movement as described herein. That is, the pixels may detect varying shades of gray, however the underlying principle used to detect movement will be the same when contrast enables determination of at least one point of contrast.

In FIG. 4A, the bottom left pixel 402 is detecting black and the adjacent pixel 404 is detecting white. (For convenience, the other pixels of the photodetector array 400 are illustrated as detecting white.) Accordingly, at a first time, photodetector array 400 has captured a first image 406 having the one pixel 402 detecting black. At a later time, represented by FIG. 4B, photodetector array 400 has captured a second image 408 having the pixel 404 detecting black and the pixel 402 detecting white. Again, assuming that the black portion of the image 406 and the black portion of the image 408 correspond to the same object portion, the shift of the black portion from pixel 402 (FIG. 4A) to pixel 404 (FIG. 4B) indicates horizontal motion of the object relative to the photodetector array 400.

Because the relative location of the pixels 402 and 404 and the focal length of the lens 128 are known, this movement of the black portion can be equated to a horizontal distance and/or angle of physical movement. That is, image data corresponding to the first image 406 is communicated to the stabilization unit 206 (FIG. 2) and/or to the stabilization and autofocus unit 312 (FIG. 3). Then, image data corresponding to the second image 408 is communicated to the stabilization unit 206 and/or to the stabilization and autofocus unit 312. A movement correlation process is performed on the received image data, thereby analyzing the image data of the first image 406 and the second image 408 to determine the magnitude of the object's horizontal movement (represented by the black detected by the pixels 402 and 404). Thus, a point of contrast (between the white and black pixels) can be determined on each image. Movement of the point of contrast is determined when successively captured images are compared. Accordingly, stabilization information corresponding to the resultant determined horizontal change in distance and/or angle (physical movement) is available to processor 110 (FIG. 1).

Similarly, in FIG. 5A, the bottom left pixel 502 is detecting black and the adjacent pixel 504 is detecting white. For convenience, the other pixels of the photodetector array 400 are illustrated as detecting white. Accordingly, at a first time, photodetector array 400 has captured a first image 506 having the one pixel 502 detecting black. At a later time, represented by FIG. 5B, photodetector array 400 has captured a second image 508 having the pixel 504 detecting black and the pixel 502 detecting white. Again, assuming that the black portion of the image 506 and the black portion of the image 508 correspond to the same object portion, the shift of the black portion from pixel 502 (FIG. 5A) to pixel 504 (FIG. 5B) indicates vertical motion of the object relative to the photodetector array 400.

Because the relative location of the pixels 502 and 504 and the focal length of the lens 128 are known, this movement of the black portion can be equated to a vertical distance and/or angle of physical movement. That is, image data corresponding to the first image 506 is communicated to the stabilization unit 206 (FIG. 2) and/or to the stabilization and autofocus unit 312 (FIG. 3). Then, image data corresponding to the second image 508 is communicated to the stabilization unit 206 and/or to the stabilization and autofocus unit 312. A movement correlation process is performed on the received image data, thereby analyzing the image data of the first image 506 and the second image 508 to determine the magnitude of the object's vertical movement (represented by the black detected by the pixels 502 and 504). Thus, a point of contrast (between the white and black pixels) can be determined on each image, and movement in the point of contrast is determined when successively captured images are compared. Accordingly, stabilization information corresponding to the resultant determined vertical change in distance and/or angle (physical movement) is available to processor 110 (FIG. 1).

In FIG. 6A, the bottom left pixel 602 is detecting black and the adjacent pixel 604 is detecting white. For convenience, the other pixels of the photodetector array 400 are illustrated as detecting white. Accordingly, at a first time, photodetector array 400 has captured a first image 606 having the one pixel 602 detecting black. At a later time, represented by FIG. 6B, photodetector array 400 has captured a second image 608 having the pixel 604 detecting black and the pixel 602 detecting white. Again, assuming that the black portion of the image 606 and the black portion of the image 608 correspond to the same object portion, the shift of the black portion from pixel 602 (FIG. 6A) to pixel 604 (FIG. 6B) indicates horizontal and vertical motion of the object relative to the photodetector array 400.

Because the relative location of the pixels 602 and 604 and the focal length of the lens 128 are known, this movement of the black portion can be equated to a horizontal and a vertical distance and/or angle of physical movement. That is, image data corresponding to the first image 606 is communicated to the stabilization unit 206 (FIG. 2) and/or to the stabilization and autofocus unit 312 (FIG. 3). Then, image data corresponding to the second image 608 is communicated to the stabilization unit 206 and/or to the stabilization and autofocus unit 312. A stabilization correlation process is performed on the received image data, thereby analyzing the image data of the first image 606 and the second image 608 to determine the magnitude of the object's movement (represented by the black detected by the pixels 602 and 604). Thus, a point of contrast (between the white and black pixels) can be determined on each image, and movement of the point of contrast is determined when successively captured images are compared. Accordingly, stabilization information corresponding to the resultant determined horizontal and vertical change in distance and/or angle (corresponding to physical movement of the object and/or image capture device) is determined.

Image data received from the photodetectors 208 is processed to determine image movement using a stabilization correlation process. Such correlation techniques are generally known in the art of correlating data received from photodetectors, and are not described in detail herein for convenience. The stabilization correlation process can be performed by the stabilization unit 206 (FIG. 2), the stabilization and autofocus unit 312 (FIG. 2) or the processor 110 (FIG. 1), depending upon the embodiment.

The above-described images captured by the photodetector array 400 were captured at a first time and at a later time. The time period between capturing the small portions of the larger image is very short because there are relatively few photodetectors 208 that must be read (recovering the light information for a photodetector) and because the amount of data (recovered light information) is relatively small, when compared to the very large number of photodetectors of photosensor 108 (FIG. 1). That is, successively captured images captured by the photodetector array 400 can be processed at a very high rate. In various embodiments, the time interval between successively captured image can approximate full image capture at thirty to in excess of one hundred frames per second. In other embodiments, the time between successively captured images may be greater than or less than the above-described time range. Accordingly, stabilization compensation can be determined and implemented within the time frame that is associated with capture of the image on the image capture medium.

Image data (received from the photodetectors 208) from two successively captured image portions are processed. In one embodiment, image data (received from the photodetectors 208) from another successively captured image portion is compared with and correlated to the immediately preceding received captured image portion, thereby determining movement associated with the next successive time period. This process of comparing successively captured image portions is repeated until the time of image capture. As a result, comparing successively captured image portions provides an ongoing determination of movement of the point of contrast. Since image data is read very quickly from the photodetector array 400 (FIG. 1) and photodetector arrays 308 and 310 (FIG. 2), movement of the point of contrast is determined in time periods not perceptible to the user. Thus, depending upon the embodiment, compensation of the actual captured image is based upon the stabilization information that is determined just before the time of image capture, at the same time of the time of image capture, or relatively close to the time of image capture. In other embodiments, the selection of a selected two of the image data received from the photodetectors 208 is compared to determine movement of the point of contrast.

The above-described simplified examples illustrate the photodetectors 208 (pixels) as detecting either black or white to demonstrate the principle of determining points of contrast. These examples are oversimplified and presented for the purpose of illustrating the principles of image stabilization performed by the various embodiments. When the photodetectors 208 detect varied light levels (or levels of gray), interpolation may be used in the stabilization correlation algorithm to determine distances of movement (jitter) in points of contrast that are less than the size of an individual photodetector 208. Such movement correlation techniques employing interpolation are generally known in the art of correlating data received from photodetectors, and are not described in detail herein for brevity.

Also, the above-described detected changes in movement of one or more points of contrast is attributed to movement of the black object portion relative to the sensor array 400. Accordingly, the described detected movement may be attributed to movement of the image capture device 102 (FIG. 1), and/or may be attributed to movement of the object itself. Therefore, stabilization compensation provided by the various embodiments is provided for both the movement of the image capture device 102 and the object. Prior art image capture devices that employ gyroscopes or other physical sensors to detect the movement (jitter) are limited to detecting movement of the image capture device itself. Such prior art image capture devices cannot detect, nor compensate, for movement of the object.

In one embodiment, the stabilization compensation is performed by determining an amount of correction that is applied to video image data that is received from photosensor 108 (FIG. 1). A stabilization compensation signal corresponding to the stabilization compensation is generated by processor 110, or another suitable processor. For example, if at the time of image capture the movement was determined to be of a certain magnitude, received image data may be selectively compensated by an amount corresponding to the detected movement. The electronic image stabilization compensation is communicated to an image processing pipeline wherein the image data is computationally compensated. Such computational compensation to electronically shift image data of video frames based upon determined motion is known and is not described herein for brevity.

In another embodiment, the stabilization compensation signal is communicated to devices (not shown) that physically move the lens 124 (or one or more components thereof), thereby compensating for the movement. In yet another embodiment, the image capture medium (such as photosensor 108 of FIG. 1 or film of a film-based camera) is moved to compensate for the detected movement. Such devices providing physical compensation is known and is not described herein for brevity.

FIG. 7 is a block diagram illustrating the autofocus portion of an embodiment of an autofocus and stabilization system 300. Illustrated is an edge view of the first lens 302 and the second lens 302, and the first photodetector array 308 and the second photodetector array 310. For convenience, lens 302 and 304 are illustrated as a single lens piece with the lens 302 and 304 formed thereon. In another embodiment, the lens 302 and 304 are separate. Lens 302 and 304 may be fabricated from plastic, glass or other suitable materials using techniques known in the art for makings lens.

The first photodetector array 308 and the second photodetector array 310 are separated by a known distance (DP, see also FIG. 3A). DP corresponds to the separation of the lens 301 and 304 (referred to a DL in FIG. 3A). The two lens are directed generally at a small portion of an object of interest that is to be captured on the image capture medium.

The first photodetector array 308 and the second photodetector array 310 concurrently communicate their respective captured image data to a processing unit. In one embodiment, the data is communicated to processor 110 (FIG. 1). In another embodiment, the data is communicated to processor 212 (FIG. 3B).

Illustrated is a graphical representation of a histogram 702 corresponding to the image data read from the first photodetector array 308, wherein one bar corresponds to light information detected by a photosensor 208 (FIGS. 3A and 3B) in photodetector array 308, and wherein height of a single bar corresponds to the detected amount of light. Similarly, histogram 704 corresponds to the image data read from the second photodetector array 310. The histograms 702 and 704 correspond to light detected from a portion of the object 706, as indicated by the arrows 708.

Figure 8:
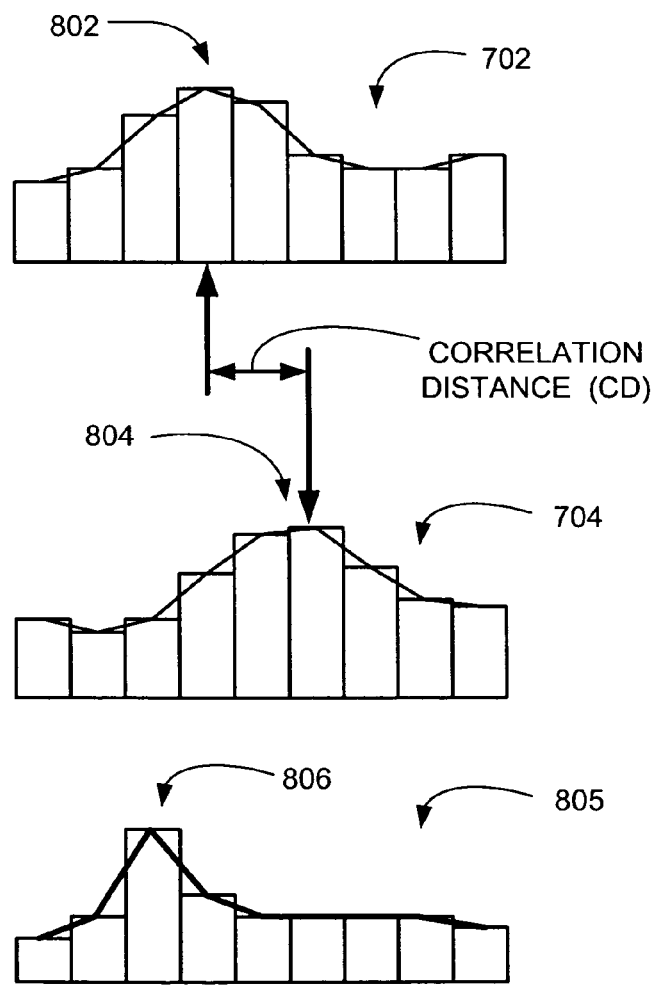
FIG. 8 is an illustrative diagram of two histograms corresponding to information from the photodetector arrays, respectively, employed by an embodiment of the autofocus and stabilization system.

FIG. 8 is an illustrative diagram of two histograms 702 and 704 corresponding to information provided from the photodetector arrays 308 and 310, respectively. Histogram 702 shows a peak at value 802 and histogram 704 shows a peak at a value 804 for illustrative purposes. In this example, the peak values might correspond to a selected point of contrast. Since the values 802 and 804 correspond to specific photodetectors 208 (FIGS. 3A and 3B) on photodetector arrays 308 and 310 (FIG. 7), respectively, the distance between the two photodetectors is used to determine a correlation distance (CD). In this simplified illustrative example, the distance CD is used to determine autofocus information that corresponds to the determined focus value.

For convenience, the histogram 702 is illustrated as being different from the histogram 704 to demonstrate that the object 706 is not in focus. Thus, one skilled in the art can appreciate the stereoscopic effect when an image is at different distances from the system 300. As described in greater detail below, an autofocus control signal will be determined from the histograms 704 and 706. The autofocus control signal is communicated to lens actuator 112 (FIG. 1), which adjusts the focus of the image capture device lens 124 (FIG. 1)

to correspond to the measured distance to the object, in order to bring the object into focus. If the object is at a reference distance (such as infinity in one embodiment) with respect to the first lens 302 and the second lens 302, the histograms 704 and 706 will be identical, or at least very similar (within a specified tolerance known by an autofocus correlation algorithm).

As described previously, correlation can alternatively be used to determine the correlation distance (CD) between the two histograms 702 and 704 (FIG. 7). The correlation function 805 is calculated using correlation algorithms. The offset of the peak 806 of the correlation function corresponds to the correlation function (CD).

Figure 9:
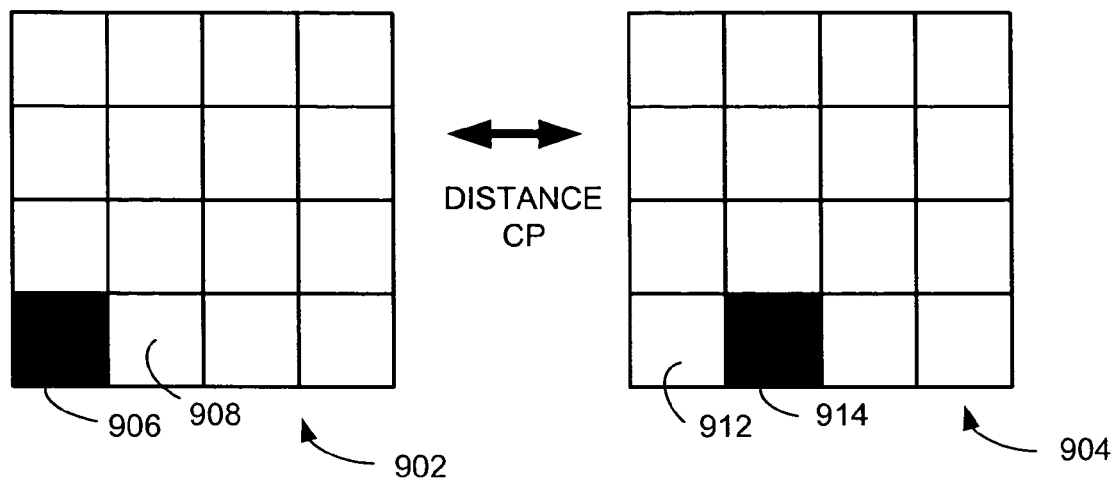
FIG. 9 is a diagram illustrating detection of an out-of-focus image by an embodiment of the autofocus and stabilization system.

FIG. 9 is a diagram illustrating detection of two concurrently captured images by an embodiment of the autofocus and stabilization system 300. For convenience, the photodetector arrays 902 and 904 are illustrated as a 16-by-16 pixel arrays. Any suitable number of pixels may be employed by various embodiments in the photodetector arrays 902 and 904. Photodetector arrays 902 and 904 correspond to one of the above-described photodetector arrays 308 and 310 (FIG. 7).

Like the arrays illustrated in FIGS. 4A-B, 5A-B and 6A-B, the photodetectors of the 16-by-16 pixel arrays 902 and 904 are illustrated for convenience as detecting a portion of an object that is either white or black. Thus, contrast (white vs. black) is maximized in the simplified illustrations of FIG. 9 such that at least a point of contrast is determined on each captured image portion. It is understood that any suitable degree of contrast detected by the photodetectors allows detection of a point of contrast on the concurrently captured image portions such that a correlation distance CD is determinable, as described herein. That is, the pixels may detect varying shades of gray, however the underlying principle used to detect focus will be the same.

In FIG. 9, the bottom left pixel 906 of array 902 is detecting black and the adjacent pixel 908 is detecting white. The bottom left pixel 912 of array 904 is detecting white and the adjacent pixel 914 is detecting black. (For convenience, the other pixels of the photodetector arrays 902 and 904 are illustrated as detecting white.) Accordingly, photodetector arrays 902 and 904 capture images having one pixel 906 and 912, respectively, detecting black. The stereoscopic effect associated with the separation distance DP between the arrays 902 and 904 has caused the arrays 902 and 904 to detect different images.

Because the distance between arrays 902 and 904, and hence the distance between the individual pixels, is known, a correlation in the position of a point of contrast on the portions of the images concurrently detected by arrays 902 and 904 can be performed, thereby determining a distance corresponding to the difference in position of the point of contrast, referred to as the correlation distance CD. In the simplified example of FIG. 9, the black portion of the detected image is separated by a distance corresponding to the width of one pixel.

Image data from the images concurrently detected by the arrays 902 and 904 are communicated to processor 110 (FIG. 1) or processor 212 (FIGS. 2B and 3B), depending upon the embodiment. The received image data is compared to determine a distance corresponding to the difference in position of a common point of contrast on the two detected images.

Accordingly, focus information corresponding to the resultant determined correlation distance CD is available to processor 110 (FIG. 1). The correlation distance CD is correlated with the known focusing parameters of image capture device lens 124 (FIG. 1). This correlation is used to determine the distance to the object, and as a result, the amount of focus adjustment to the lens 124 such that an image detected by the image capture medium will be in focus. A focus adjustment signal is communicated to the lens actuator 112 (FIG. 1) such that lens actuator 112 adjusts the focus of lens 124, thereby focusing the image on the image capture medium. The focus adjustment is determined based upon the determined difference in position of the point of contrast. This process is referred to as a focus correlation process. Depending upon the embodiment, the image is focused on the film of a film based image capture device or the photosensor 108 (FIG. 1) of a digital image capture device.

In one alternative embodiment, correlation of a plurality of (relatively) high points of contrast on the concurrently captured image portions detected by arrays 902 and 904 allows a corresponding number of correlation distances to be determined. The correlation distances can be determined in a vertical orientation, horizontal orientation, or along another orientation, depending on the orientation of the system 300. For example, if lenses 302 and 304 and sensor arrays 208 are separated vertically by a distance DL, the correlation distance CD will measure the vertical difference in position of point(s) of contrast.

Figure 10:
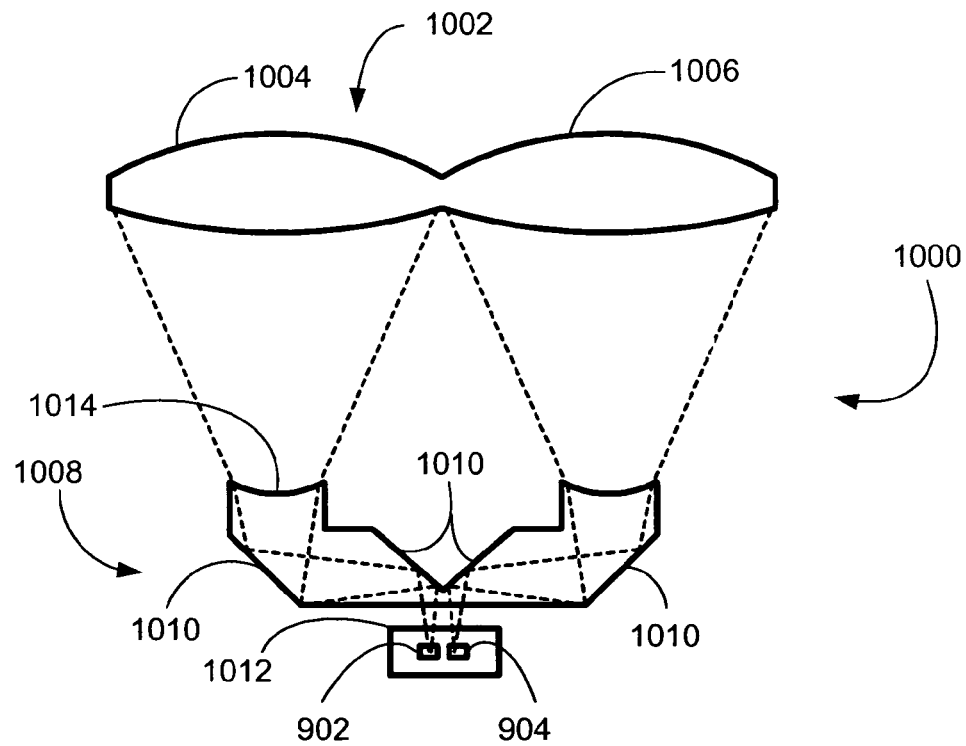
FIG. 10 is a block diagram illustrating an alternative embodiment of the autofocus and stabilization system.

FIG. 10 is a block diagram illustrating embodiment of a lens system 1000 employed by an embodiment of the autofocus and stabilization system 300. A dual objective lens piece 1002 comprises two lens 1004 and 1006. A folding prism 1008 is configured to receive light from the lens 1004 and 1006 to reflect the light onto the photodetector arrays 902 and 904 as illustrated. Thus the folding prism 1008 comprises a plurality of reflective surfaces 1010 that reflects light received from the dual lens 1002.

In one embodiment, the photodetector arrays 902 and 904 are fabricated on a silicon chip 1012. The dual lens 1002 and folding prism 1008 may be fabricated as a single piece and coupled to the silicon chip 1012 to form a unitary system. Concave elements 1014 may be used to increase the effective focal length of the lens system 1000. Note that in this embodiment, the distance between photosensors DP may be substantially less than the distance between lenses DL.

Figure 11:
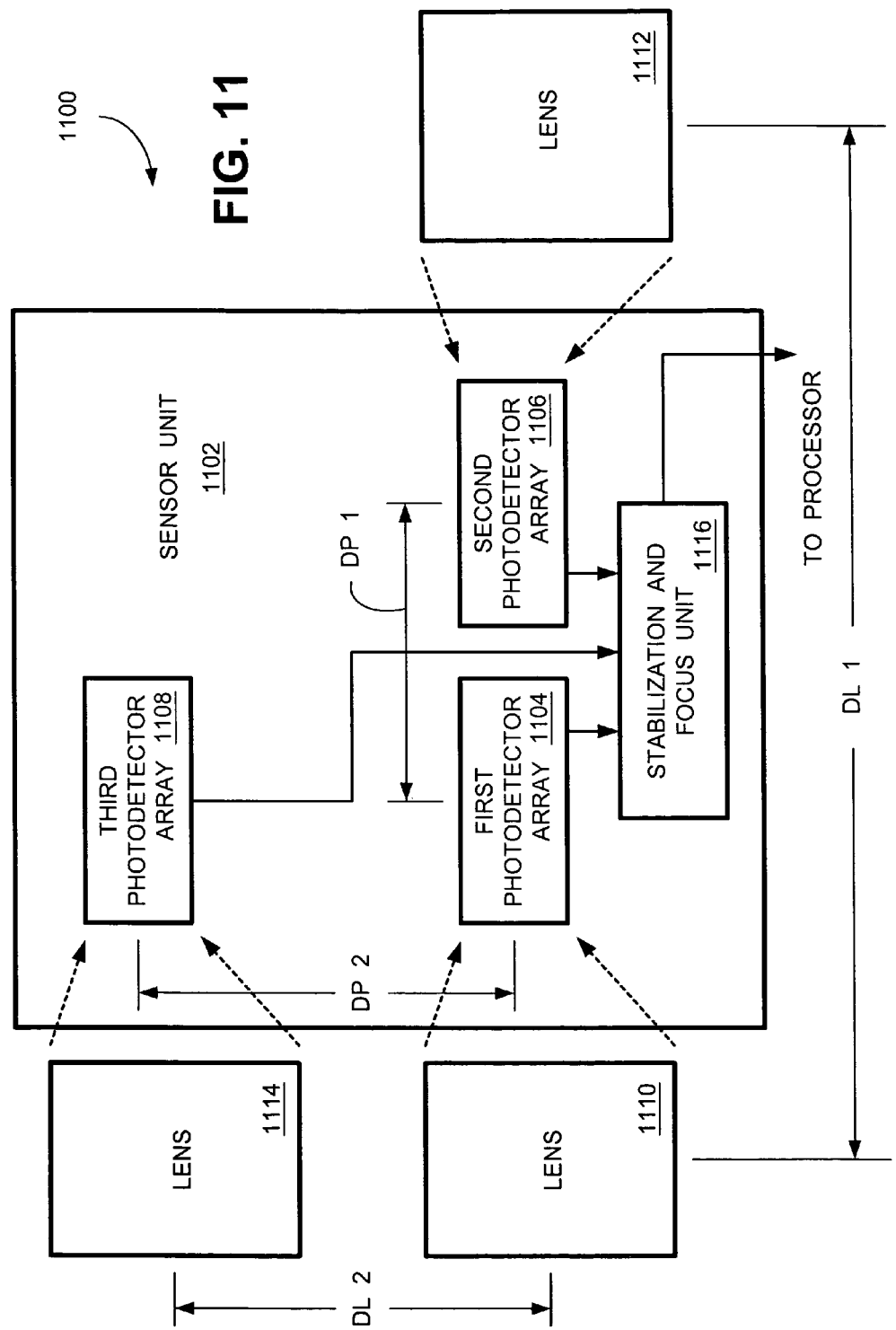
FIG. 11 is a block diagram of an alternative embodiment of an autofocus and stabilization system.

FIG. 11 is a block diagram of an alternative embodiment of an autofocus and stabilization system 1100. Sensor unit 1102 comprises three photo detector arrays (1104, 1106 and 1108), three lens (1110, 1112 and 1114) and a stabilization and focus unit 1116.

Lens 1110 provides an image to the first photodetector array 1104, which provides image data to the stabilization and focus unit 1116. Similarly, lens 1112 provides an image to the second photodetector array 1106, which provides image data to the stabilization and focus unit 1116. Lens 1114 provides an image to the third photodetector array 1108, which also provides image data to the stabilization and focus unit 1116.

The first photodetector array 1104 and the second photodetector array 1106 are separated by a known distance (DP1), which corresponds to the distance DL 1 between the lens 1110 and 1112. The first photodetector array 1104 and the third photodetector array 1108 are separated by a known distance (DP2), which corresponds to the distance DL 2 between the lens 1110 and 1114. As described above, the first photodetector array 1104 and the second photodetector array 1106 provide information to determine focus along the horizontal axis. In a similar manner, the first photodetector array 1104 and the third photodetector array 1108 provide information to determine focus along a vertical axis.

Figure 12:
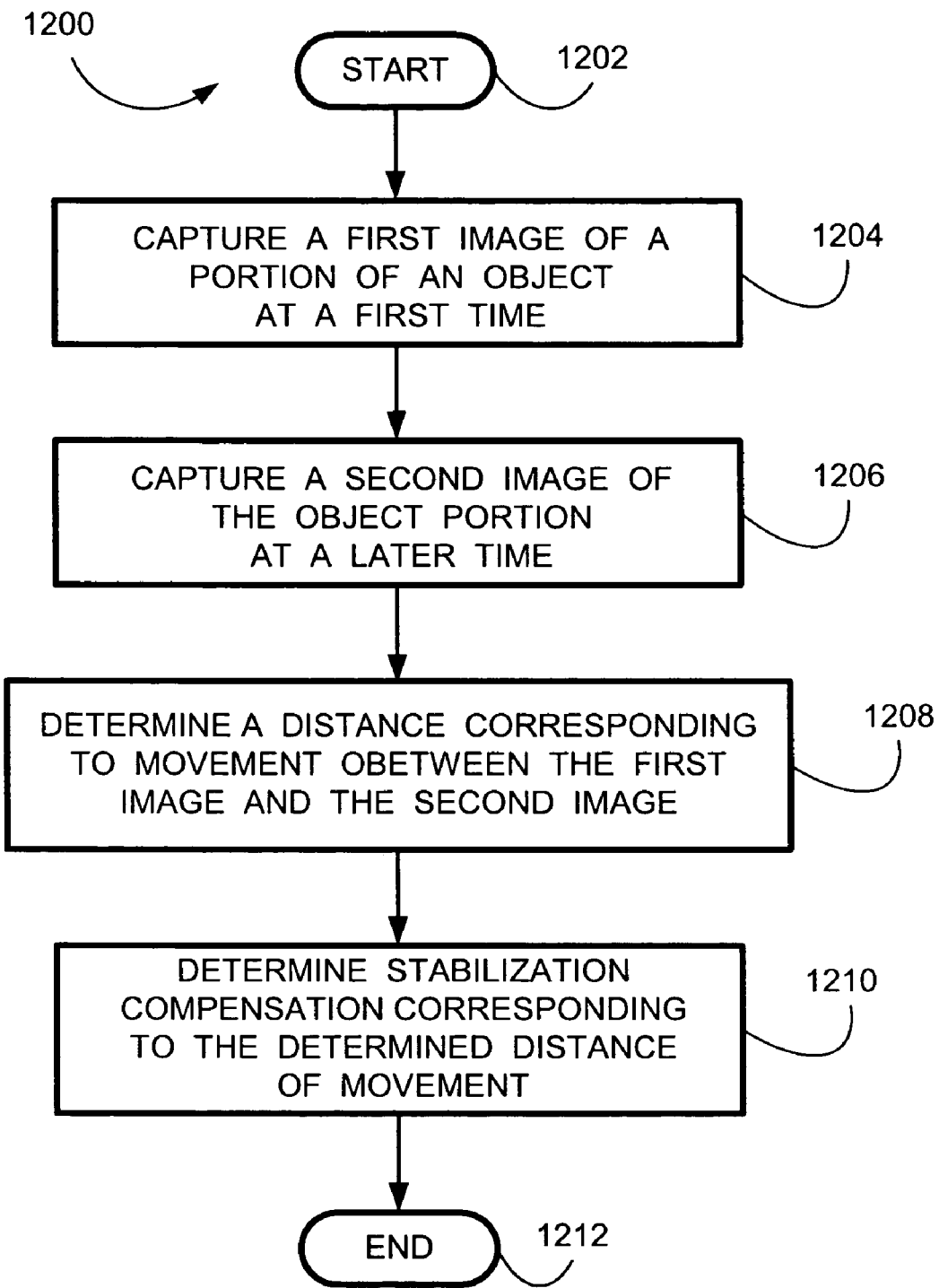
FIG. 12 shows a flow chart illustrating an embodiment of image capture device configured to provide image stabilization.
Figure 13:
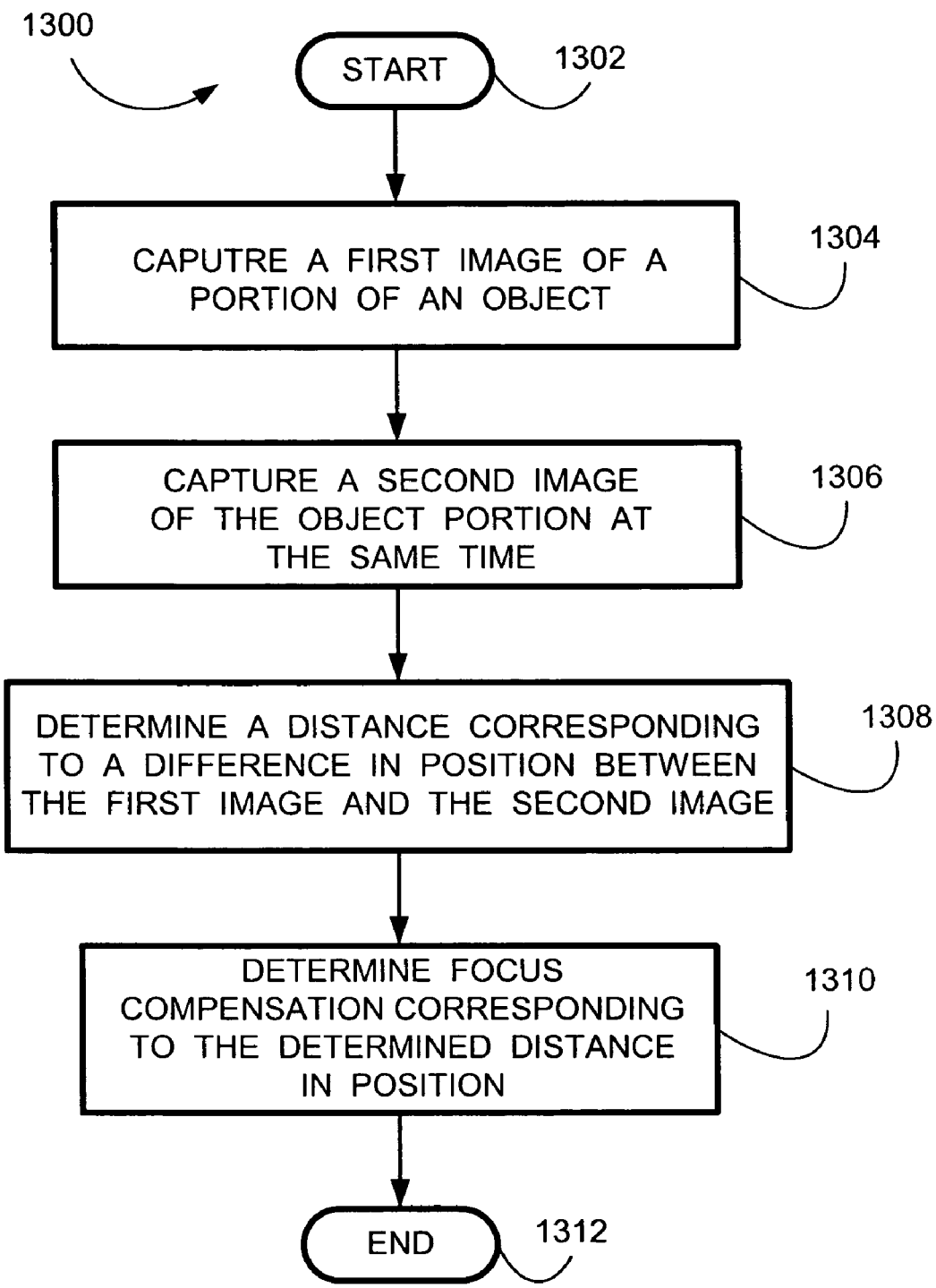
FIG. 13 shows a flow chart illustrating an embodiment of image capture device configured to provide image focus.
Figure 14:
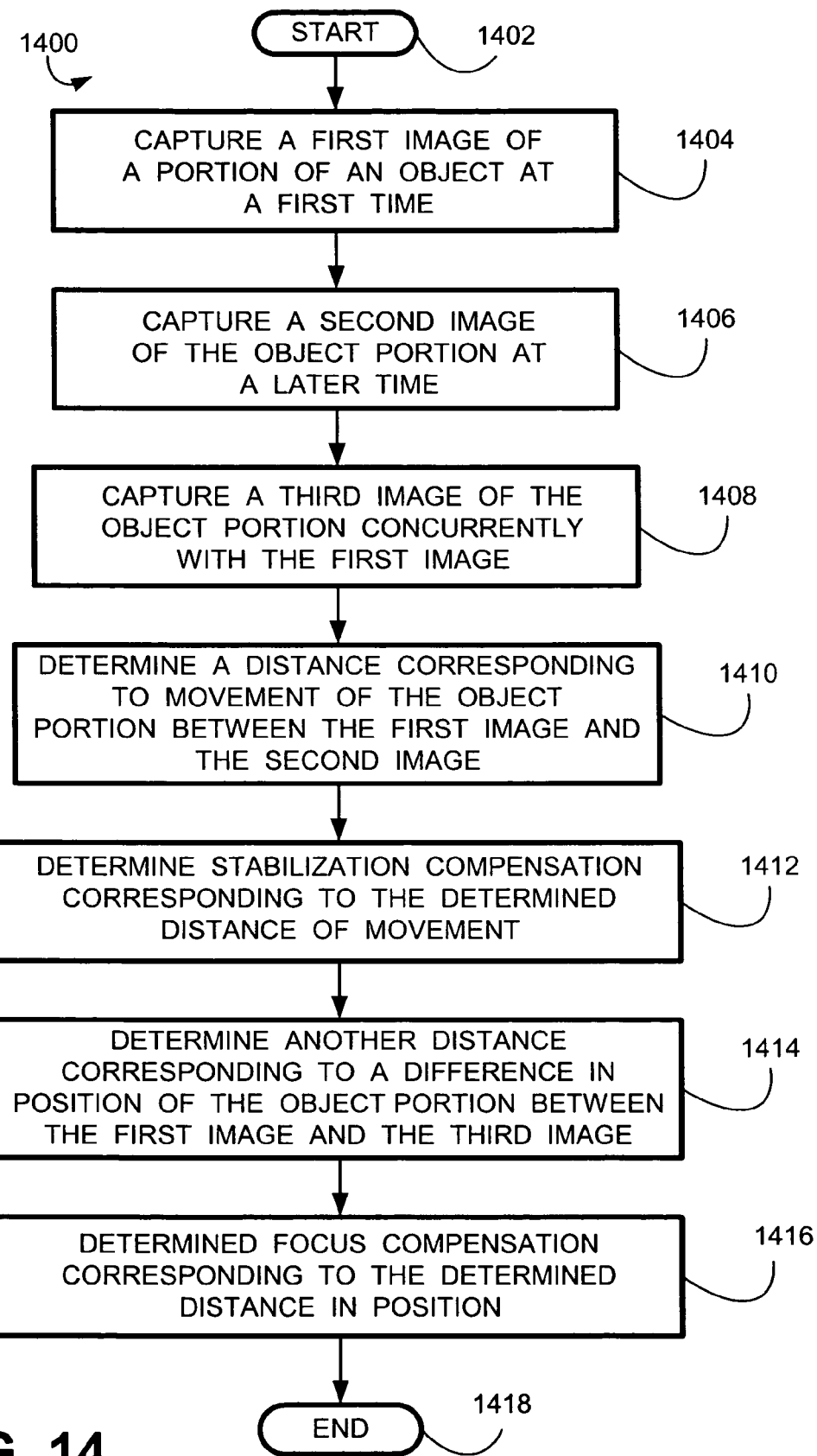
FIG. 14 shows a flow chart illustrating an embodiment of image capture device configured to provide image stabilization and image focus.

FIG. 12 shows a flow chart 1200 illustrating an embodiment of image capture device 100 (FIG. 1) configured to provide image stabilization. FIG. 13 shows a flow chart 1300 illustrating an embodiment of image capture device 100 (FIG. 1) configured to provide image focus. FIG. 14 shows a flow chart 1400 illustrating an embodiment of image capture device 100 (FIG. 1) configured to provide image stabilization and image focus.

The flow charts 1200, 1300 and 1400 of FIGS. 12, 13 and 14, respectively, show the architecture, functionality, and operation of an embodiment for implementing the above-described logic. An alternative embodiment implements the logic of flow charts 1200, 1300 and 1400 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIGS. 12, 13 of 14, or may include additional functions. For example, two blocks shown in succession in FIG. 12, 13 or 14 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein.

The process of flowchart 1200 (FIG. 12) for providing image stabilization begins at block 1202. At block 1204, a first image of a portion of an object is captured at a first time (wherein the object portion corresponds to an object of interest that is to be captured by an image capture device through an image capture device lens). At block 1206, a second image of the object portion is captured at a later time. At block 1208, a distance corresponding to movement between the first image and the second image is determined. At block 1210, stabilization compensation corresponding to the determined distance of movement is determined. The process ends at block 1212.

The process of flowchart 1300 (FIG. 13) for providing image focus begins at block 1302. At block 1304, a first image of a portion of an object is captured at a first time (wherein the object portion corresponds to an object of interest that is to be captured by an image capture device through an image capture device lens). At block 1306, a second image of the object portion is captured at the same time. At block 1308, a distance corresponding to a difference in position between the first image and the second image is determined. At block 1310, an amount of focus compensation corresponding to the determined distance in position is determined. The process ends at block 1312.

The process of flowchart 1400 (FIG. 14) for providing image stabilization and image focus begins at block 1402. At block 1404, a first image of a portion of an object is captured at a first time (wherein the object portion corresponds to an object of interest that is to be captured by an image capture device through an image capture device lens). At block 1406, a second image of the object portion is captured at a later time. At block 1408, a third image of the object portion is captured concurrently with the first image. At block 1410, a distance corresponding to movement of the object portion between the first image and the second image is determined. At block 1412, stabilization compensation corresponding to the determined distance of movement is determined. At block 1414, another distance corresponding to a difference in position of the object portion between the first image and the third image is determined. At block 1416, an amount of focus compensation corresponding to the determined distance in position is determined. The process ends at block 1418.

Embodiments implemented in memory 106 (FIG. 1) or memory 214 (FIGS. 2B and 3B) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

When operating in the preview mode, a sequentially captured plurality of preview images may be displayed to the user. As the image is focused, the user can view the final focused preview image. Similarly, as the image is stabilized for movement, the stabilized preview image can be viewed.

Embodiments are described in the context of digital image capture devices and film-based image capture devices that capture still images. Other embodiments are configured to provide image stabilization and/or focus to video image capture devices (digital or film based).

It should be emphasized that the above-described embodiments are merely examples of implementations. Many variations and modifications may be made to the above-described embodiments. All such modifications and variations are intended to be included herein within the scope of this disclosure and protected by the following claims.

Therefore, at least the following is claimed:

1. An image capture device comprising: an image sensor operable to produce image data responsive to light; a photodetector array, separate and distinct from the image sensor, operable to generate image data responsive to light; an optical assembly configured to focus an entire field of view onto the image sensor and to direct onto the photodetector array only a portion of the entire field of view corresponding to less than the entire field of view focused onto the image sensor; and a processor configured to receive from the photodetector array image data corresponding to the portion of the entire field of view directed by the optical assembly at a first time and a second time, determine a change in position in the received image data from the first time to the second time, and determine image stabilization information that corresponds to the determined change in position.

2. The image capture device of claim 1, wherein the processor is further configured to determine at least a point of contrast in the image data received in each of the first and second times such that the determined change in position is based upon a change in position of the points of contrast.

3. The image capture device of claim 1, wherein the processor is further configured to perform correlation on data from the image data received in each of the first and second times such that the determined change in position is based upon the correlation.

4. The image capture device of claim 1, wherein the optical assembly is a camera lens, wherein only the camera lens focuses the image of the entire field of view, and wherein only the image sensor captures the image of the entire field of view.

5. The image capture device of claim 1, wherein the image sensor is configured to capture a digital still image.

6. The image capture device of claim 5, wherein the image sensor has a greater number of pixels than the photodetector array.

7. The image capture device of claim 5, wherein the image sensor comprises individual pixels for generating separable image data responsive to light, the photodetector array comprises individual pixels for generating separable image data responsive to light, and the pixels of the photodetector array are larger in physical size than the pixels of the image sensor.

8. The image capture device of claim 1, wherein the image sensor comprises film configured to capture a film-based still image.

9. The image capture device of claim 1, wherein the image sensor is configured to capture a video image.

10. The image capture device of claim 1, further comprising a second photodetector array that is separate and distinct from the image sensor and the first photodetector array and is configured to generate image data responsive to light, wherein the optical assembly comprises a stereoscopic lens system operable to image the portion of the entire field of view corresponding to less than all of the entire field of view focused onto the image sensor from different stereoscopic positions respectively onto both the first photodetector array and the second photodetector array, and the processor is configured to receive image data respectively generated by the first and second photodetector arrays at the first and second times, determine a difference in position based on the image data respectively generated by the first and second photodetector arrays, and determine image focus information based on the difference in position.

11. The image capture device of claim 10, wherein the processor is further configured to determine at least a point of contrast in the image data received from each of the first and second photodetector arrays, and to determine the change in position based upon a change in position of the points of contrast.

12. The image capture device of claim 10, wherein the processor is further configured to perform correlation on the image data received from each of the first and second photodetector arrays, and to determine the change in position based on the determined correlation.

13. The image capture device of claim 10, further comprising a lens actuator coupled to the optical assembly, wherein the lens actuator is configured to receive an autofocus control signal generated by the processor that corresponds to the image focus information, wherein the lens actuator adjusts focus of the optical assembly in response to receiving the autofocus control signal.

14. The image capture device of claim 10, further comprising a lens actuator coupled to the optical assembly, wherein the lens actuator is configured to receive an autofocus control signal generated by another processor that receives the image focus information from the processor, and wherein the lens actuator adjusts focus of the optical assembly in response to receiving the autofocus control signal.

15. A stabilization system that compensates for captured image movement, comprising: a photodetector array operable to generate image data responsive to light; an optical assembly configured to focus an entire field of view onto an image sensor that is separate and distinct from the photodetector array, and configured to focus only a fractional portion of the entire field of view onto the photodetector array; and a processor operable to determine a change in position image data respectively captured by the photodetector array at a first time and a second time, and to determine image stabilization information corresponding to the determined change in position.

16. The stabilization system of claim 15, wherein the processor is further configured to determine at least a point of contrast in the image data respectively captured by the photodetector array in each of the first and second times such that the determined change in position is based upon a change in position of the points of contrast.

17. The stabilization system of claim 15, wherein the processor is further configured to perform correlation on data from the image data respectively captured by the photodetector array each of the first and second times such that the determined change in position is based upon the correlation.

18. The stabilization system of claim 15, wherein the photodetector array further comprises a plurality of horizontally aligned photosensors that enable the processor receiving the captured image data to determine a change in position of a point of contrast in a horizontal orientation.

19. The stabilization system of claim 15, wherein the photodetector array further comprises a plurality of vertically aligned photosensors that enable the processor receiving the captured image data to determine a change in position of a point of contrast in a vertical orientation.

20. The stabilization system of claim 15, wherein the processor and the photodetector array are fabricated on a silicon chip, and wherein the processor communicates the image stabilization information to another processor that compensates for the determined change in position.

21. A method for compensating for movement during image capture, the method comprising: focusing an entire field of view onto an image sensor; onto a photodetector array that is separate and distinct from the image sensor, directing only a portion of the entire field of view corresponding to less than all of the entire field of view focused onto the image sensor; on the image sensor, capturing an image the entire field of view; on the photodetector array, capturing a first image of the portion of the field of view at a first time and a second image of the portion of the field of view at a later time; determining a distance corresponding to movement between the first image and the second image; and determining stabilization compensation corresponding to the determined distance of movement.

22. The method of claim 21, wherein determining the distance further comprises correlating the first image and the second image.

23. The method of claim 21, wherein determining the distance further comprises determining at least one point of contrast in the first image and the second image.

24. The method of claim 23, further comprising: determining a plurality of points of contrast in the first image and the second image; determining a corresponding plurality of distances, each distance corresponding to movement of the respective points of contrast between the first image and the second image; correlating the plurality of distances; and determining the stabilization compensation corresponding to the correlated plurality of distances of movement.

25. The method of claim 21, wherein determining image compensation further comprises generating a stabilization compensation signal such that received image data from the image capture medium may be selectively compensated by an amount corresponding to the determined distance.

26. The method of claim 25, further comprising communicating the stabilization compensation signal for focusing the field of view onto the image sensor.

27. The method of claim 25, further comprising communicating the stabilization compensation signal such that the image sensor is moved to compensate for the movement.

28. The method of claim 25, further comprising communicating the stabilization compensation signal such that image data from the image sensor is computationally compensated.

* * * * *